United States Patent
Tang et al.

(10) Patent No.: US 8,572,436 B2
(45) Date of Patent: Oct. 29, 2013

(54) COMPUTING DEVICE AND METHOD FOR MANAGING MOTHERBOARD TEST

(75) Inventors: Xin-Qiao Tang, Shenzhen (CN); Yang Zhong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 291 days.

(21) Appl. No.: 13/217,280

(22) Filed: Aug. 25, 2011

(65) Prior Publication Data

US 2012/0110382 A1 May 3, 2012

(51) Int. Cl.
*G06F 11/00* (2006.01)

(52) U.S. Cl.
USPC .............. 714/33; 714/25; 714/32; 714/37

(58) Field of Classification Search
USPC ........... 714/25, 27, 30, 32, 33, 37, 39, 40, 45, 714/46, 48, 57
See application file for complete search history.

(56) References Cited

U.S. PATENT DOCUMENTS

| | | | | |
|---|---|---|---|---|
| 2005/0235187 A1* | 10/2005 | Lai et al. | ........................ | 714/733 |
| 2005/0246589 A1* | 11/2005 | Tsai et al. | ........................ | 714/38 |
| 2008/0313503 A1* | 12/2008 | Zhu et al. | ........................ | 714/45 |
| 2009/0158093 A1* | 6/2009 | Chen et al. | ........................ | 714/32 |
| 2013/0073906 A1* | 3/2013 | Hsieh et al. | ........................ | 714/30 |

* cited by examiner

*Primary Examiner* — Joseph D Manoskey
(74) *Attorney, Agent, or Firm* — Altis & Wispro Law Group, Inc.

(57) ABSTRACT

A system and method for managing a test of a motherboard can create a first test data consisting of test items. In the first test data, one or more selected test items to perform can be identified. A second test data is obtained by performing a logical NOR operation on the test bits corresponding to the selected test items. After performing the test items, a third test data is created by setting the test bits corresponding to the selected test items that pass the test to the test bits of the selected test items in the first test data, and by setting the test bits corresponding to the selected test items that fail the test to the test bits of the test items that have not been selected in the first test data. By comparing the third with the test data, a test result of the motherboard is obtained.

20 Claims, 4 Drawing Sheets

COMPUTING DEVICE AND METHOD FOR MANAGING MOTHERBOARD TEST

BACKGROUND

1. Technical Field

Embodiments of the present disclosure generally relate to testing computing devices, and more particularly to a computing device and a method for managing testing of a motherboard.

2. Description of Related Art

A method of testing a motherboard may attesting a plurality of predetermined test items with the motherboard. The test items may include a memory test, a central processing unit (CPU) test, a north bridge test, and a south bridge test, and are stored in a configuration file. However, test personnel may modify the configuration file to remove one or more of the test items, that the motherboard would otherwise fail, in order to produce false positive results. Therefore, a more secure method for controlling a test process of a computing device is desired.

DETAILED DESCRIPTION

In general, the word "module," as used hereinafter, refers to logic embodied in hardware or firmware, or to a collection of software instructions, written in a programming language, such as, for example, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
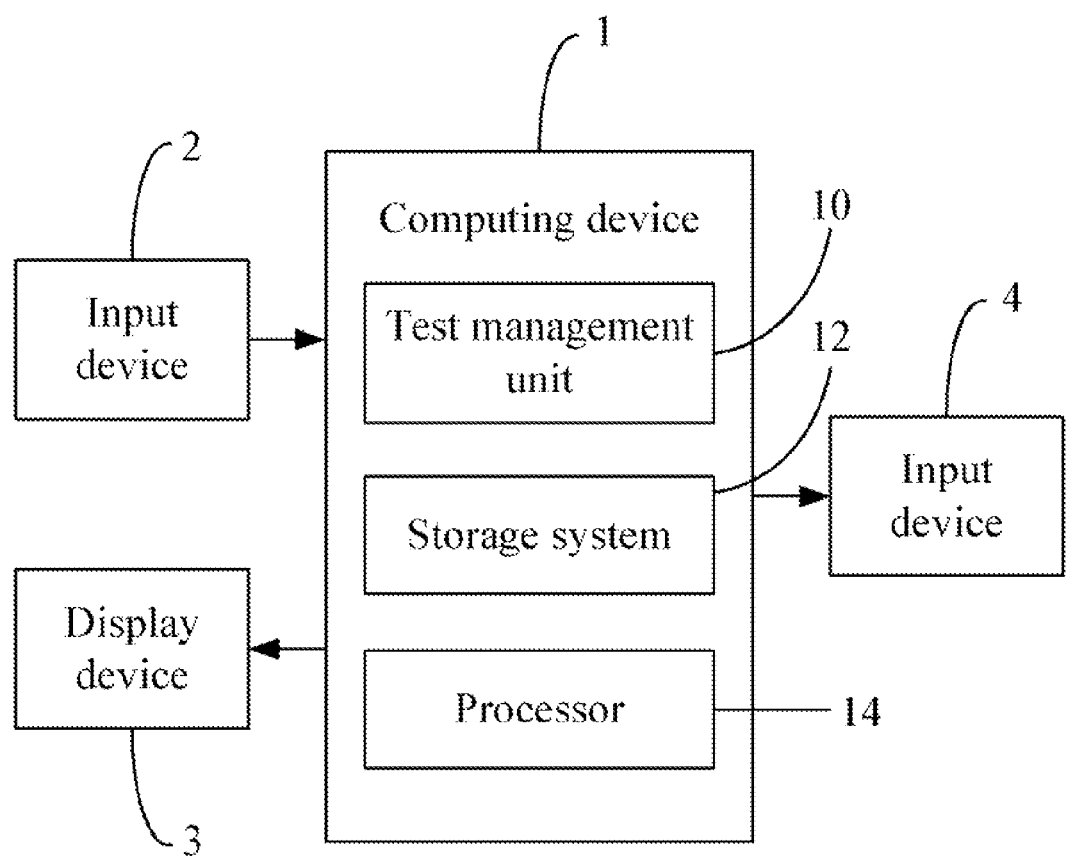
FIG. 1 is a block diagram of one embodiment of a computing device including a test management unit.

FIG. 1 is a block diagram of one embodiment of a computing device 1 including a test management unit 10. In the embodiment, the functions of the unit 10 are implemented by the device 1. The unit 10 can test a motherboard 4 according to test codes, obtain test results according to changes to the test codes, and display the test results on a display device 3. Detail functions of the unit 10 are described, in reference to FIG. 2, below.

In one embodiment, the device 1 may be any electronic device (e.g., a computer) that includes at least one processor 14. The unit 10 may comprise computerized code in the form of one or more programs that are stored in a storage system 12, and executed by the processor 14.

In one embodiment, the storage system 12 may be a magnetic or an optical storage system, such as a hard disk drive, an optical drive, a compact disc, a digital video disc, a tape drive, or other suitable storage medium.

The device 1 is further electronically connected to an input device 2. The input device 2 may be a keyboard, or a mouse. During the process of testing the motherboard 4, the input device 2 is used for receiving user input for generating the test codes, such as a serial number that identifies type of the motherboard 4.

Figure 2:
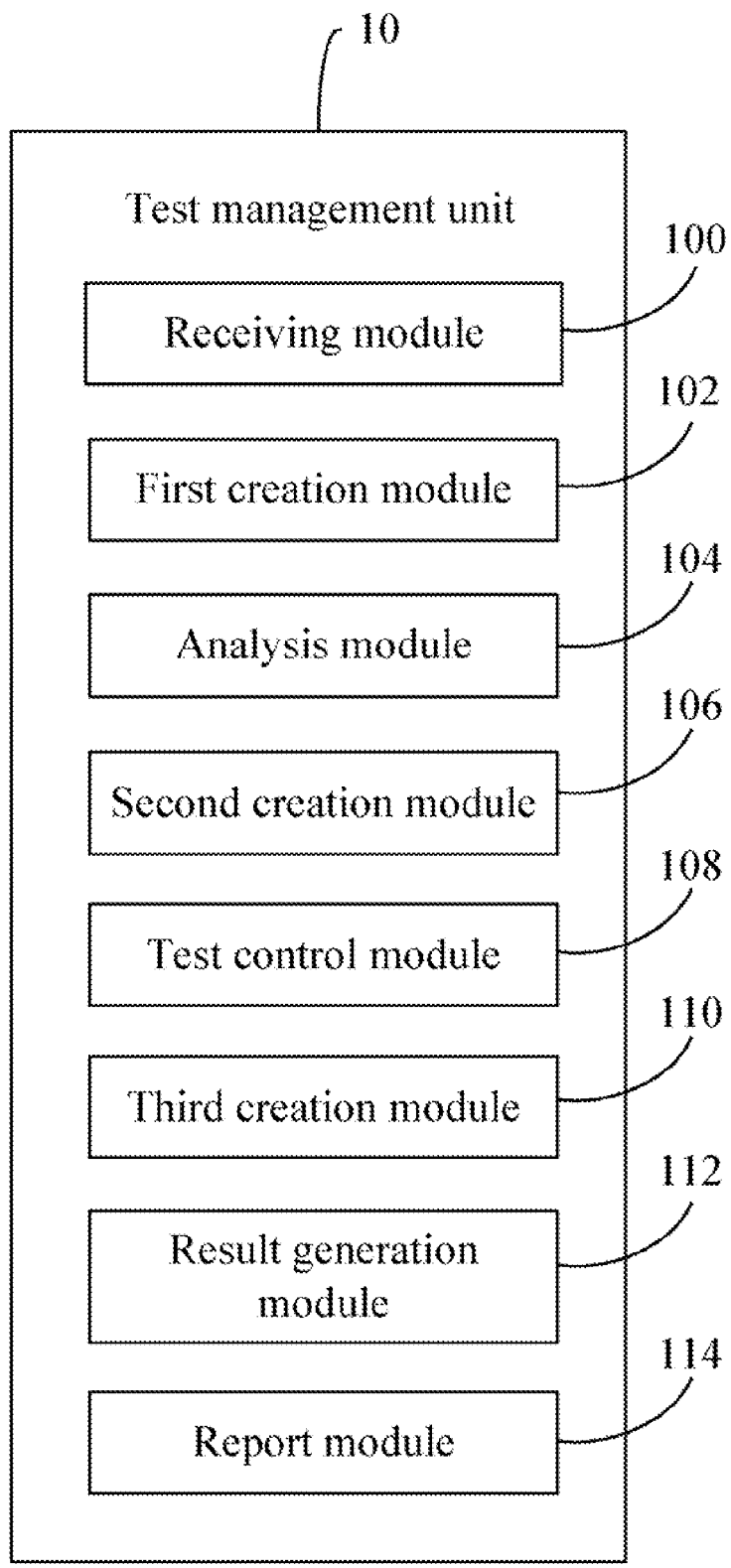
FIG. 2 is block diagram of one embodiment of function modules of the test management unit in FIG. 1.

FIG. 2 is block diagram of one embodiment of function modules of the test management unit 10 in FIG. 1. In one embodiment, the test management unit 10 includes a receiving module 100, a first creation module 102, an analysis module 104, a second creation module 106, a test control module 108, a third creation module 110, a result generation module 112, and a report module 114. Each of the modules 100-114 may be a software program including one or more computerized instructions that are stored in the storage system 12 and executed by the processor 14. The processor 14 may be a central processing unit or a math co-processor, for example.

In the embodiment, the display device 3 provides an interface (e.g., a graphical user interface) of the test management unit 10, and displays a plurality of motherboard 4 test items. The test items may include a memory test, and a central processing unit test of the motherboard 4, for example (i.e., testing a memory, a CPU, and the motherboard). The receiving module 100 receives a selection operation of the test items to be performed, and receives an input of the serial number of the motherboard 4 from the input device 2.

Figure 4:
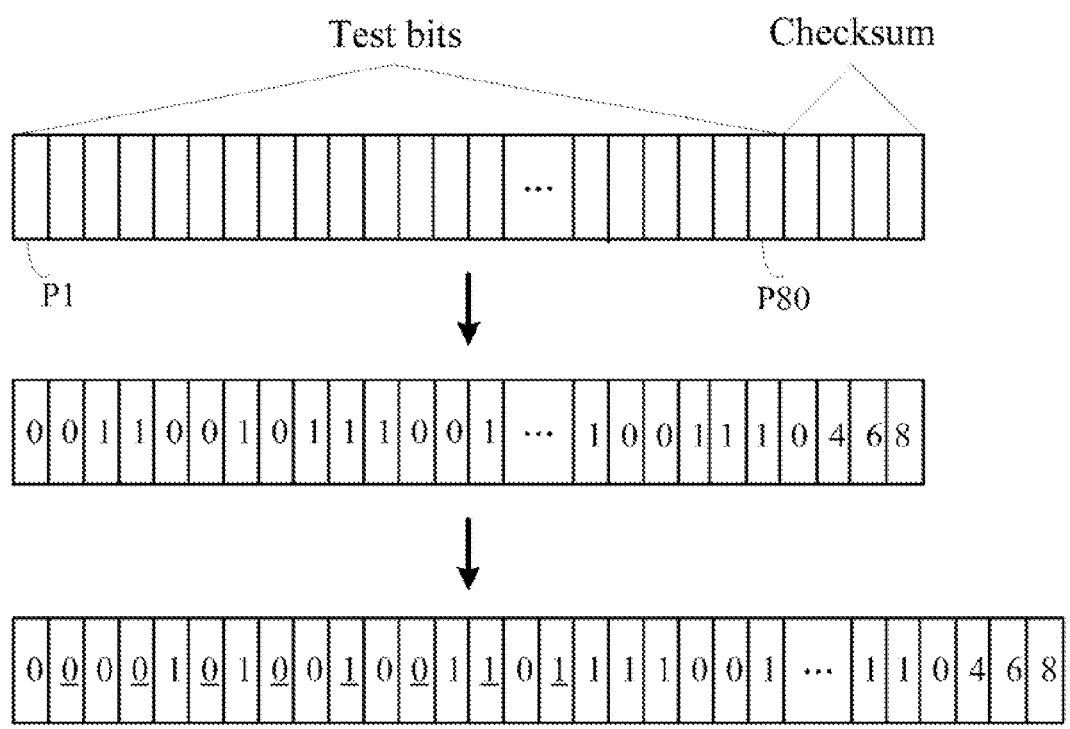
FIG. 4 is a schematic diagram illustrating one example of generating a first series of test codes.

The first creation module 102 creates first test data consisting of all of the test items for the particular type of the motherboard 4 as determined by the serial number of the motherboard 4, and writes the first test data into a test script. In the embodiment, the first test data include test bits (as shown in the second rows of FIG. 4 represented by binary numbers) and a checksum (e.g., "0468" shown in the second rows of FIG. 4), and each of the test bits represents a test item of the motherboard 4. By reading the first test data from the test script, the test items have been selected to perform can be identified. For example, a test bit corresponding to the selected test item in the first test data can be "1", and a test bit corresponding to the test item that has not been selected to perform in the first test data can be "0".

A number of the test bits is a multiple of eight. The checksum is in the form of a decimal code. In the embodiment, the checksum is a fixed-size datum computed from the test bits (each eight test bits are converted to a decimal numeral) for the purpose of detecting accidental errors that may have been introduced during a storage of the test bits. Integrity of the test bits can be checked at any later time by re-computing the checksum and comparing the recomputed checksum with the stored checksum. If the checksums match, the test bits were almost certainly not altered. For example, the motherboard 4 includes eighty test items. As shown in FIG. 4, the first test data include eighty test bits, for example, from a first test bit "P1" to a $80^{th}$ test bit "P80". The checksum is "0468" shown in FIG. 4.

In one embodiment, the test bits of the first test data are arranged according to a test order of the test items of the motherboard 4. For example, the first test bit represents the first test item of the motherboard 4, and the $80^{th}$ test bit represents the $80^{th}$ test item of the motherboard 4. The checksum is appended to the first test data.

In embodiments, some portion of the serial number may be used to identify the type of the motherboard 4. In this embodiment, the last two numbers of the serial number of the motherboard 4 are converted to binary code, and then the binary code is inserted into the first test data according to a pre-defined position. That is, the first test data further includes the binary code of some portion of the serial number. In the embodiment, in order to avoid decryption and manipulation of the first test data, the predefined position may be preset by a designated operator or management personnel during designing and programming of the test management unit 10, and kept secret from test operators. For example, as illustrated in FIG. 4, if the last two digits of the serial number are used to identify the motherboard 4, and the last two digits of the serial number of the motherboard 4 are "11", then "11" can be converted into binary code "00001011", and the bits comprising "11" inserted among the first test data according to the predefined position. For example, as shown in the third row of FIG. 4, the binary bits forming "11" are underlined in the first test data.

The second creation module 106 obtains second test data by performing a logical NOR operation on the test bits corresponding to the selected test items in the first test data. For example, if a test bit corresponding to the selected test item in the first test data is "1", the second creation module 106 changes the test bit from "1" to "0".

The test control module 108 tests the motherboard 4 by performing the selected test items according to the test order of the selected test items in the second test data, and determines whether each of the selected test items passes the test of the motherboard 4.

If any selected test item fails the test, the third creation module 110 sets the test bit corresponding to the selected test item in the second test data to the test bit of the test item that have not been selected in the first test data. If one selected test item passes the test, the third creation module 110 sets the test bit corresponding to the selected test items in the second test data to the test bit of the selected test item in the first test data. For example, if the test bit corresponding to the selected test item in the first test data is "1", and the test bit corresponding to the test item that has not been selected to perform in the first test data is "0", the third creation module 110 sets the test bit corresponding to the selected test item that fails the test to "0", and sets the test bit corresponding to the selected test item that passes the test to "1". According to the test, the third creation module 110 can create a third test data.

The result generation module 112 determines a test result of the motherboard 4 by comparing the third test data with the first test data. In detail, if any test bit of the third test data is different from a corresponding test bit in the first test data, the result generation module 112 determines that the third test data is different from the first test data, and generates the test result indicating that the motherboard 4 fails the test. Otherwise, if each of the test bits in the third test data is identical to the corresponding test bit of the first test data, the result generation module 112 determines that the third test data is identical to the first test data, and generates the test result indicating that the motherboard 4 passes the test.

For example, if the third test bit "P3" of the third test data is "1", and the third test bit "P3" of the first test data is "0", the result generation module 112 determines that the third test data is different from the first test data, and generates a test result indicating that the motherboard 4 fails the test.

The report module 114 reports the test result of the motherboard 4, and displays the test result on the computing device 3.

Figure 3:
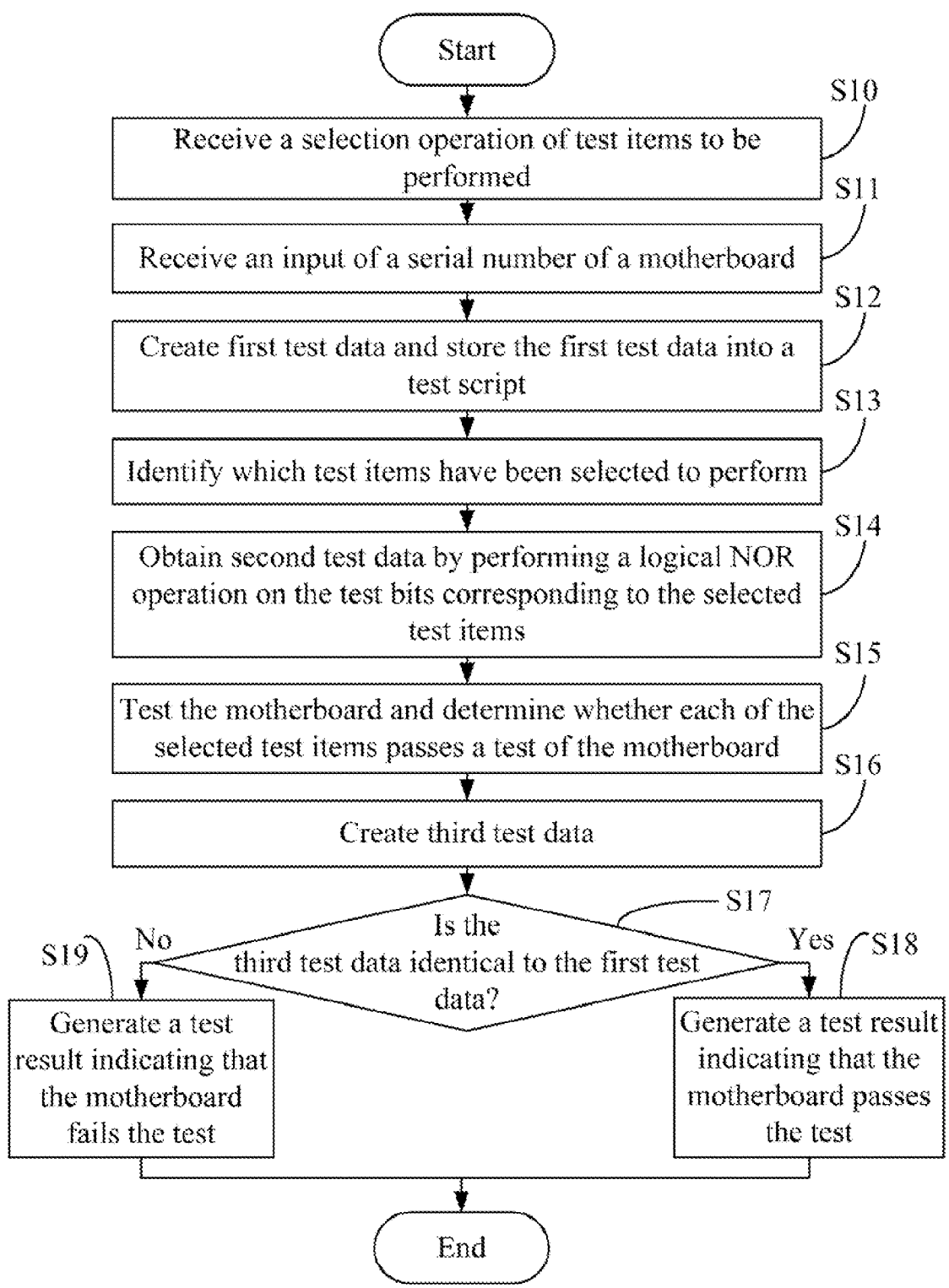
FIG. 3 is a flowchart illustrating one embodiment of a method for managing testing of a motherboard using the computing device of FIG. 1.

FIG. 3 is a flowchart illustrating one embodiment of a method for managing test of the motherboard 4. The method can be performed by execution of a computer-readable program by the at least one processor 14 of the computing device 1. Depending on the embodiment, in FIG. 3, additional blocks may be added, others removed, and the ordering of the blocks may be changed.

In block S10, the receiving module 100 receives a selection operation of the test items to be performed.

In block S11, the receiving module 100 receives an input of the serial number of the motherboard 4.

In block S12, the first creation module 102 creates first test data consisting of all of the test items for the particular type of the motherboard 4 as determined by the serial number of the motherboard 4, and writes the first test data into a test script. In the embodiment, the first test data include test bits and a checksum, and each of the test bits represents a test item of the motherboard 4. The number of test bits is a multiple of eight. For example, the motherboard 4 includes eighty test items. As shown in FIG. 4, the first test data include eighty test bits, for example, from a first test bit "P1" to a $80^{th}$ test bit "P80". The checksum is in the form of a decimal code, and is used for detecting any changes, accidental or otherwise, to the test bits. As shown in FIG. 4, the checksum "0468" is appended to the first test data and may be checked at any time by, for example, a supervisor to verify the integrity of the test procedure.

In block S13, the analysis module 104 can identify which test items have been selected to perform by reading the first test data from the test script. For example, a test bit corresponding to the selected test item in the first test data can be "1", and a test bit corresponding to the test item that has not been selected to perform in the first test data can be "0".

In block S14, the second creation module 106 obtains second test data by performing a logical NOR operation on the test bits corresponding to the selected test items in the first test data. For example, if a test bit corresponding to the selected test item in the first test data is "1", the second creation module 106 changes the test bit from "1" to "0".

In block S15, the test control module 108 tests the motherboard 4 by performing the selected test items according to the test order of the selected test items in the second test data, and determines whether each of the selected test items passes the test of the motherboard 4.

In block S16, the third creation module 110 creates third test data by setting the test bits corresponding to the selected test items that pass the test in the second test data to the test bits of the selected test items in the first test data, and by setting the test bits corresponding to the selected test items that fail the test in the second test data to the test bits of the test items that have not been selected in the first test data For example, if the test bit corresponding to the selected test item in the first test data is "1", and the test bit corresponding to the test item that has not been selected to perform in the first test data is "0", the third creation module 110 sets the test bit corresponding to the selected test item that fails the test to "0", and sets the test bit corresponding to the selected test item that passes the test to "1".

In block S17, the result generation module 112 determines whether the third test data is identical to the first test data by comparing the third test data with the first test data. If the third test data is identical to the first test data, block S18 is implemented. If the third test data is different from the first test data, block S19 is implemented.

In block S18, the result generation module 112 generates a test result indicating that the motherboard 4 passes the test, and the report module 114 reports the test result to the display device 3, and the test result is displayed on the display device 3.

For example, if the third test bit "P3" of the third test data is "1", and the third test bit "P3" of the first test data is "0", in block S19, the result generation module 112 determines that the third test data is different from the first test data, and generates a test result indicating that the motherboard 4 fails the test, and the report module 114 reports the test result to the display device 3, and the test result is displayed on the display device 3.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method using a computing device, the method comprising:
   creating a first test data consisting of test items for a particular type of a motherboard according to a serial number of the motherboard, and writing the first test data into a test script, the first test data comprising test bits and a checksum, each of the test bits representing a test item of the motherboard;
   reading the first test data from the test script, and identifying selected test items to perform according to the test bits corresponding to the selected test items;
   obtaining a second test data by performing a logical NOR operation on the test bits corresponding to the selected test items in the first test data;
   testing the motherboard by performing the selected test items in the second test data, and determining whether each of the selected test items passes a test of the motherboard;
   creating a third test data by setting the test bits corresponding to the selected test items that pass the test in the second test data to the test bits of the selected test items in the first test data, and by setting the test bits corresponding to the selected test items that fail the test in the second test data to the test bits of the test items that have not been selected in the first test data;
   determining a test result of the motherboard by comparing the third test data with the first test data; and
   reporting the test result of the motherboard to display on a display device that is electronically connected to the computing device.

2. The method as described in claim 1, wherein the test result indicates that the motherboard passes the test, upon the condition that the third test data is identical to the first test data, or wherein the test result indicates that the motherboard fails the test, upon the condition that the third test data is different from the first test data.

3. The method as described in claim 2, further comprising:
   determining that the third test data is different from the first test data, upon the condition that any test bit of the third test data is different from a corresponding test bit in the first test data; and
   determining that the third test data is identical to the first test data, upon the condition that each of the test bits of the third test data is identical to the corresponding test bit of the first test data.

4. The method as described in claim 1, further comprising:
   storing the third test data in a storage system of the computing device.

5. The method as described in claim 1, further comprising:
   receiving a selection operation of the test items to be performed; and
   receiving an input of the serial number of the motherboard.

6. The method as described in claim 1, wherein the test bits in the first test data are arranged according to a test order of the test items.

7. The method as described in claim 1, wherein the first test data further includes binary code of parts of the serial number.

8. A computing device, the computing device comprising:
   at least one processor;
   a storage system; and
   one or more modules that are stored in the storage system and executed by the at least one processor, the one or more modules comprising:
   a first creation module operable to create a first test data consisting of test items for a particular type of a motherboard according to a serial number of the motherboard, and write the first test data into a test script, the first test data comprising test bits and a checksum, each of the test bits representing a test item of the motherboard;
   an analysis module operable to read the first test data from the test script, and identify selected test items to perform according to the test bits corresponding to the selected test items;
   a second creation module operable to obtain a second test data by performing a logical NOR operation on the test bits corresponding to the selected test items in the first control data;
   a test control module operable to test the motherboard by performing the selected test items in the second test data, and determining whether each of the selected test items passes a test of the motherboard;
   a third creation module operable to create a third test data by setting the test bits corresponding to the selected test items that pass the test in the second test data to the test bits of the selected test items in the first test data, and by setting the test bits corresponding to the selected test items that fail the test in the second test data to the test bits of the test items that have not been selected in the first test data;
   a result generation module operable to determine a test result of the motherboard by comparing the third test data with the first test data; and
   a report module operable to report the test result of the motherboard to display on a display device that is electronically connected to the computing device.

9. The computing device as described in claim 8, wherein the test result indicates that the motherboard passes the test, upon the condition that the third test data is identical to the first test data, or wherein the test result indicates that the motherboard fails the test, upon the condition that the third test data is different from the first test data.

10. The computing device as described in claim 9, wherein the result generation module is further operable to:
    determine that the third test data is different from the first test data, upon the condition that any test bit of the third test data is different from a corresponding test bit in the first test data; and
    determine that the third test data is identical to the first test data, upon the condition that each of the test bits of the third test data is identical to the corresponding test bit of the first test data.

11. The computing device as described in claim 8, wherein the report module is further operable to store the third test data in a storage system of the computing device.

12. The computing device as described in claim 8, further comprising a receiving module operable to receive a selection operation of the test items to be performed, and receive an input of the serial number of the motherboard.

13. The computing device as described in claim 8, wherein the test bits in the first test data are arranged according to a test order of the test items.

14. The computing device as described in claim 8, wherein the first test data further includes binary code of parts of the serial number.

15. A non-transitory storage medium having stored thereon instructions that, when executed by a processor of a computing device, causes the processor to perform a method for managing a test procedure of a motherboard, the method comprising:

creating a first test data consisting of test items for a particular type of a motherboard according to a serial number of the motherboard, and writing the first test data into a test script, the first test data comprising test bits and a checksum, each of the test bits representing a test item of the motherboard;

reading the first test data from the test script, and identifying selected test items to perform according to the test bits corresponding to the selected test items;

obtaining a second test data by performing a logical NOR operation on the test bits corresponding to the selected test items in the first test data;

testing the motherboard by performing the selected test items in the second test data, and determining whether each of the selected test items passes a test of the motherboard;

creating a third test data by setting the test bits corresponding to the selected test items that pass the test in the second test data to the test bits of the selected test items in the first test data, and by setting the test bits corresponding to the selected test items that fail the test in the second test data to the test bits of the test items that have not been selected in the first test data;

determining a test result of the motherboard by comparing the third test data with the first test data; and reporting the test result of the motherboard to display on a display device that is electronically connected to the computing device.

16. The non-transitory storage medium as described in claim 15, wherein the test result indicates that the motherboard passes the test, upon the condition that the third test data is identical to the first test data, or wherein the test result indicates that the motherboard fails the test, upon the condition that the third test data is different from the first test data.

17. The non-transitory storage medium as described in claim 16, wherein the method further comprises:

determining that the third test data is different from the first test data, upon the condition that any test bit of the third test data is different from a corresponding test bit in the first test data; and determining that the third test data is identical to the first test data, upon the condition that each of the test bits of the third test data is identical to the corresponding test bit of the first test data.

18. The non-transitory storage medium as described in claim 15, wherein the method further comprises:

storing the third test data in a storage system of the computing device.

19. The non-transitory storage medium as described in claim 15, wherein the test bits in the first test data are arranged according to a test order of the test items.

20. The non-transitory storage medium as described in claim 15, wherein the first test data further includes binary code of parts of the serial number.

* * * * *